United States Patent
Lundblad

(12)
(10) Patent No.: US 6,661,157 B1
(45) Date of Patent: Dec. 9, 2003

(54) ACTIVE ANTI-VIBRATION SYSTEM FOR CUTTING TOOLS UTILIZING PIEZO-ELECTRIC ELEMENTS

(75) Inventor: Mikael Lundblad, Gävle (SE)

(73) Assignee: Sandvik Aktiebolaget, Sandviken (SE)

( * ) Notice: Subject to any disclaimer, the term of this patent is extended or adjusted under 35 U.S.C. 154(b) by 0 days.

(21) Appl. No.: 09/913,271

(22) PCT Filed: Feb. 8, 2000

(86) PCT No.: PCT/SE00/00242

§ 371 (c)(1),
(2), (4) Date: Oct. 17, 2001

(87) PCT Pub. No.: WO00/47408

PCT Pub. Date: Aug. 17, 2000

(30) Foreign Application Priority Data

Feb. 10, 1999 (SE) .............................................. 9900441

(51) Int. Cl.[7] .............................................. H01L 41/08
(52) U.S. Cl. ............ 310/328; 310/316.01; 310/323.01; 310/326
(58) Field of Search ............... 310/317, 323.01, 310/326, 328, 358, 323.18

(56) References Cited

U.S. PATENT DOCUMENTS

| | | | | |
|---|---|---|---|---|
| 4,849,668 A | * | 7/1989 | Crawley et al. | 310/328 |
| 5,458,222 A | * | 10/1995 | Pla et al. | 188/378 |
| 5,485,053 A | * | 1/1996 | Baz | 310/326 |
| 5,733,074 A | * | 3/1998 | Stock et al. | 408/17 |
| 6,510,738 B1 | * | 1/2003 | Lee et al. | 73/579 |

FOREIGN PATENT DOCUMENTS

| | | |
|---|---|---|
| JP | 63-180401 | 7/1988 |
| SE | 514 525 | 10/1998 |
| SE | 515 157 | 10/1998 |
| WO | WO 00/25964 | 5/2000 |

OTHER PUBLICATIONS

Article: Mechanical Engineering "Smart skis and other adaptive structures", Ashley, Steven (Nov. 1995) pp 76–81.
Article: Design News "Electronics–Hone Ski Performance", Lynch, Terrence (Feb. 5, 1996) (3 pp).
Article: The Boston Globe "Putting old skis to rest was unsettling idea whose time had come", Chamberlain, Tony (Feb. 29, 1996) (1 p.).
Article: The Boston Globe "FasTrack", Auerbach, Jon (Dec. 6, 1995) (1 p.).

* cited by examiner

*Primary Examiner*—Mark Buss
(74) *Attorney, Agent, or Firm*—Burns, Doane, Swecker & Mathis, LLP

(57) ABSTRACT

Tool for chip removing machining includes a shank having a clamping end and a cutting insert at an opposite end, plus a number of piezo-elements for dampening vibrations therein. A pair of cooperating, flat-shaped piezo-elements with lengths that are shorter than that of the shank, are placed on opposing sides of the shaft in an area adjacent to the region where the shank is secured in the machine wherein the direction of polarization of the piezo-elements is parallel to the longitudinal axis of the shank. The piezo-elements constitute actuators that are actively steerable through the application of a voltage from a source of electricity via a control device in the form of a logic control circuit, to thereby dampen the bending vibrations of the shank.

9 Claims, 4 Drawing Sheets

Figure 1:
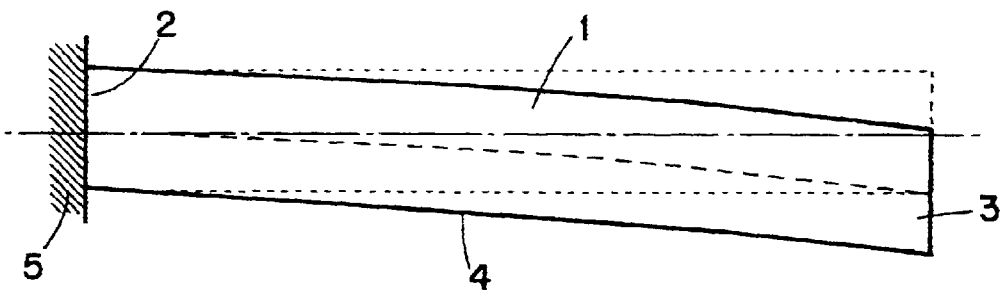

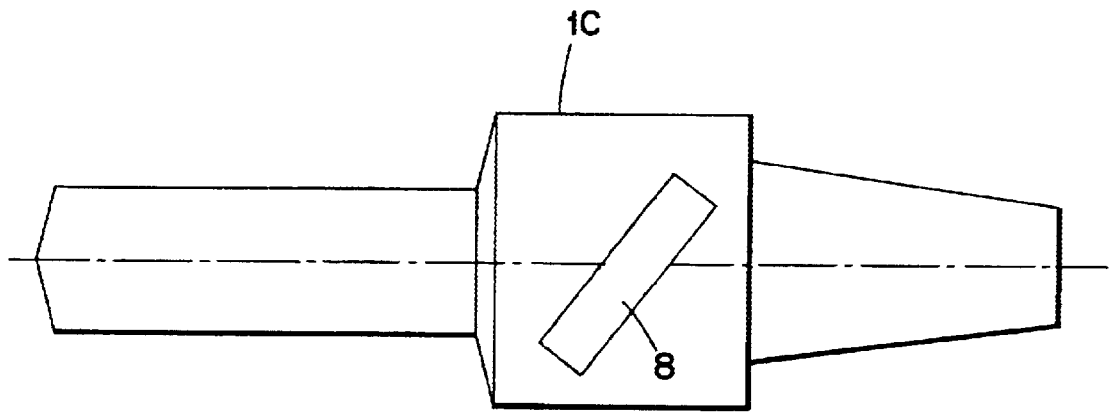
*Fig. 10*
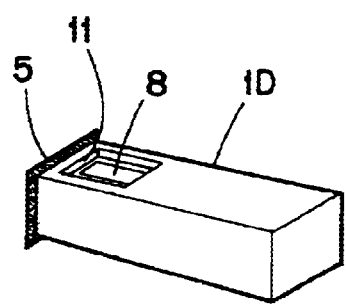  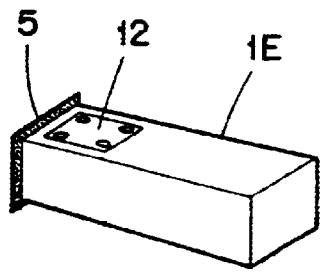  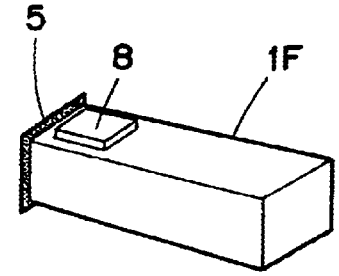
*Fig. 11*            *Fig. 12*            *Fig. 13*

ACTIVE ANTI-VIBRATION SYSTEM FOR CUTTING TOOLS UTILIZING PIEZO-ELECTRIC ELEMENTS

TECHNICAL FIELD OF THE INVENTION

This invention relates to a tool intended for chip removing machining of the type that comprises a shank having a clamping end and having a machining element at an opposite end.

BACKGROUND TO THE INVENTION

During chip removing machining, such as turning or drilling, problems often arise with vibration, specially in cases where the length of the shank or the tool is at least 4–5 times larger than the diameter thereof. One type of vibration is bending vibration, the shank being bent to and fro and submitted to bending deformations. This phenomenon constitutes a common problem, for instance during turning, specially internal turning, where the shank in the form of a boring bar has to be long in order to reach the workpiece, at the same time as the diameter of the bar is limited by the dimension of the hole in which machining is carried out. During such drilling, turning and milling operations, where the distance to the workpiece is large, extension units are used, which frequently cause bending vibration leading not only to deteriorated dimensional accuracy and irregularities in the workpiece, but also to reduced service life of the milling cutter and its cutting insert or the machining element thereof.

Another type of vibration is torsional vibration, the shank being turned or screwed to and fro around the longitudinal axis thereof during which shear strain is created. Such vibration arises, for instance, during drilling, specially at higher speed. Also torsional vibration leads to a poorer quality of the machined surface, as well as reduced service life of tools and cutting inserts. An important nuisance is also the working environment problem which torsional vibrations give rise to, in that a shrill noise is generated during rotation.

PRIOR ART

Dampening of vibrations in tools for chip removing machining has previously taken place by pure mechanical dampening, the shank being formed with a cavity in which a mass of, for instance, counter-vibrating heavy metal is applied. In doing so, the weight and the position of the mass is tuned in order to bring about dampening of the vibration within a certain range of frequencies. The cavity is then filled with a viscous liquid, e.g. oil, and is plugged. However, this technique works tolerably well only in those cases where the length of the shank is approx. 4–10 times longer than the diameter thereof. In addition to this limitation, the pure mechanical dampening has an obvious disadvantage inasmuch as the range of frequencies within which the dampening acts is very limited. An additional nuisance consists of the weakening of the structural strength, which the cavity formed in the shank entails.

In entirely different technology areas, a development of more efficient, adaptive dampening techniques, has been started with the utilization of, among other things, piezo-elements. A piezo-element consists of a material, most often of a ceramic type, which on compression or strain in a certain direction—the direction of polarization—generates an electric field in this direction. The piezo-element is usually in the shape of a rectangular plate with a direction of polarization, which is parallel to the major axis of the plate. By connecting the piezo-element to an electrical circuit, including a control module, and compressing or elongating the piezo-element in the direction of polarization, an electric current will be generated and flow in the circuit, electric resistive components included in the control module releasing heat according to known physics. In doing so, vibration energy is converted to thermal energy, whereby a passive dampening, but not totally neutralizing effect on the vibration is obtained. What is more, by forming the control module with a suitable combination of resistive and reactive components, so called shunts, selected frequencies may be brought to be dampened particularly effectively. Such frequencies are advantageously the so called "eigenvalue" frequencies of the exposed eigenmodes of the object in question, which are the ones that are especially excited.

Conversely, a piezo-element may be compressed or elongated by the fact that an electric voltage is applied over the piezo-element, and this may be used as a control device or operating device (actuator). This may, then be used for an active vibration reduction by the fact that the polarity of the applied electric voltage is chosen in such a way that the mechanical stress of the operating device acts in the opposite direction, as an external, mechanical stress, the emergence of vibration being suppressed by the fact that other kinetic energy, for instance energy of rotation, is not permitted to translate into vibration energy. The synchronization of the applied electric voltage in respect to the external mechanical tension, the effect of which should be counteracted, is then carried out by the fact that a feedback signal from a deformation sensitive sensor is fed to a control means in the form of a logical control circuit, e.g. a programmable microprocessor, in which the signal is processed to almost instantaneously control the electric voltage applied over the operating device. The control function, i.e. the relation between the input signal from the sensor and the output voltage, may then be made very complex. A self-learning system for adaptation to varying conditions is, for instance, feasible. The sensor may consist of a separate, deformation sensitive device, e.g. a second piezo-element, or be common with the operating device.

Examples of realized applications and current development areas for utilization of piezo-elements in vibration dampening purposes are described in Mechanical Engineering, November 1995, p. 76–81. Thus, skis for alpine skiing (K2 Four ski, K2 Corp., USA) have been equipped with piezo-element with the purpose of repressing undesired vibration, which otherwise decreases the contact with the ground and thereby reduces the skier's prospect of a stable and controlled skiing. Furthermore, applications such as increased wing stability of aeroplanes, improved comfort in motor vehicles, suppression of vibrations in rotor blades and shafts of helicopters, vibration reduction of machining platforms for flexible manufacture, and increased hit precision of military weapons are mentioned. In data sheets from Active Control eXperts (ACX) Inc., USA (manufacturer of piezo-elements) vibration reduction of snowboards is also mentioned.

OBJECTS AND FEATURES OF THE INVENTION

The present invention aims at managing the shortcomings of previously known tools for chip removing machining mentioned in the introduction and at providing a tool with an improved vibration dampening. Thus, a primary object of the invention is to provide a robust tool with the ability to efficiently dampening of vibrations over a wide range of frequencies, for instance where the length of the shank is 3–15 times larger than the diameter thereof, preferably approx. 4–6 times longer than the diameter thereof. It is also an object to provide a tool for chip removing machining having a longer service life for the tool itself as well as the cutting element thereof, compared to previously known tools. Additional objects of the tool are that the use thereof should lead to an increased quality of the surface of the machined workpiece and to an improved working environment by reduction of high frequency noise.

According to the invention, at least the primary object is attained by the features defined in the characterizing part of claim 1. Preferred embodiments of the invention are furthermore defined in the dependent claims.

BRIEF DESCRIPTION OF THE APPENDED DRAWINGS

Figure 2:
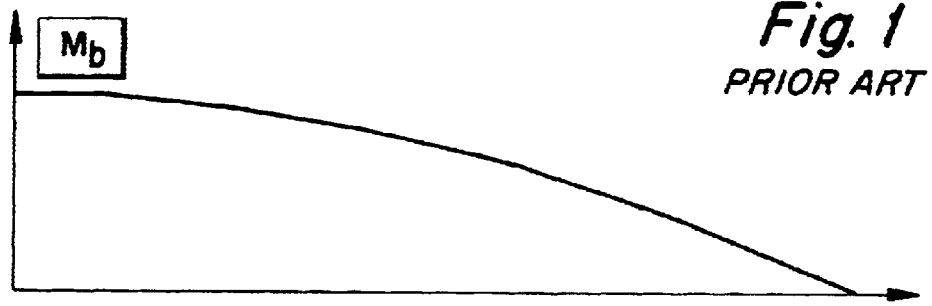
Figure 3:
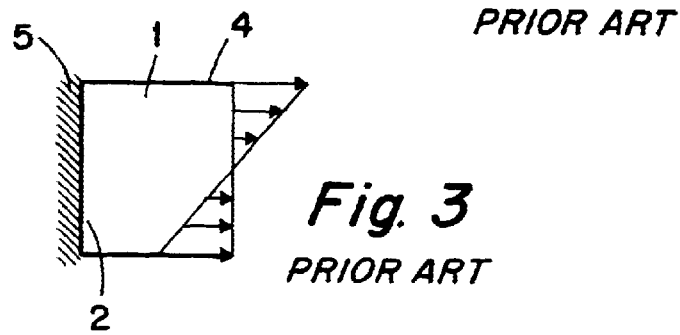
Figure 4:
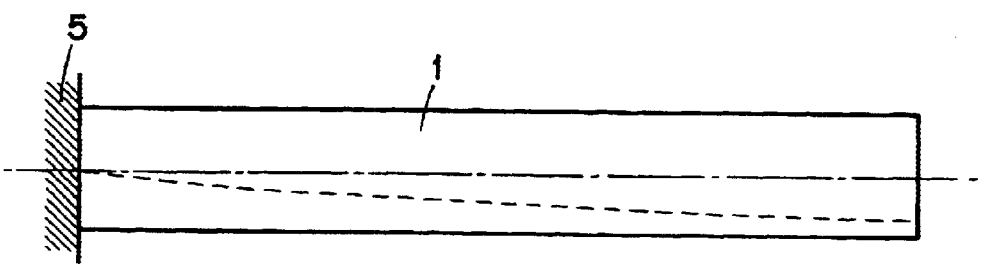
Figure 5:
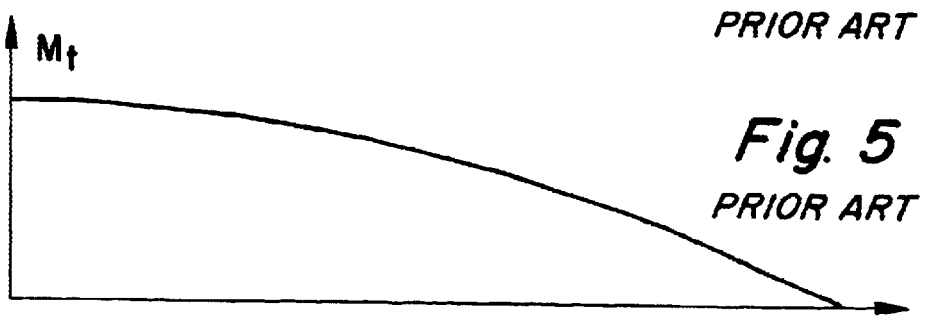
Figure 6:
Figure 7:
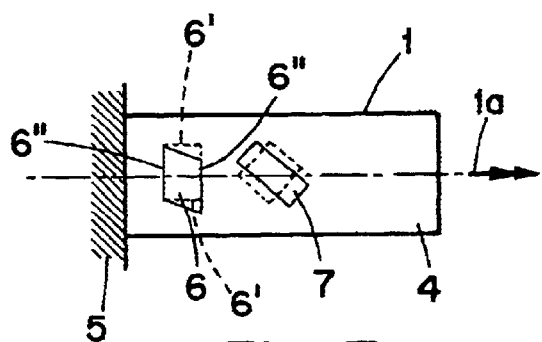
Figure 8:
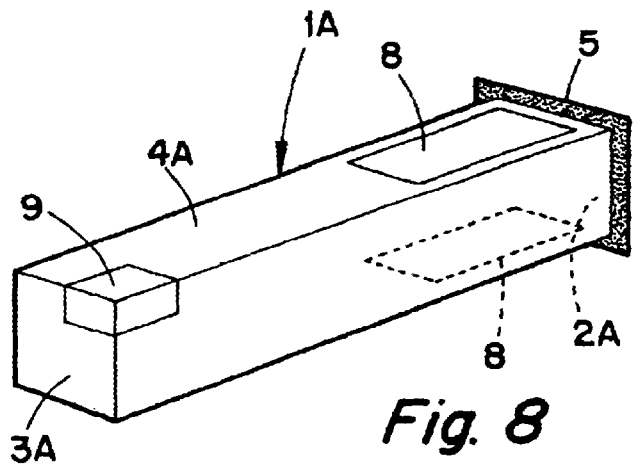
Figure 9:
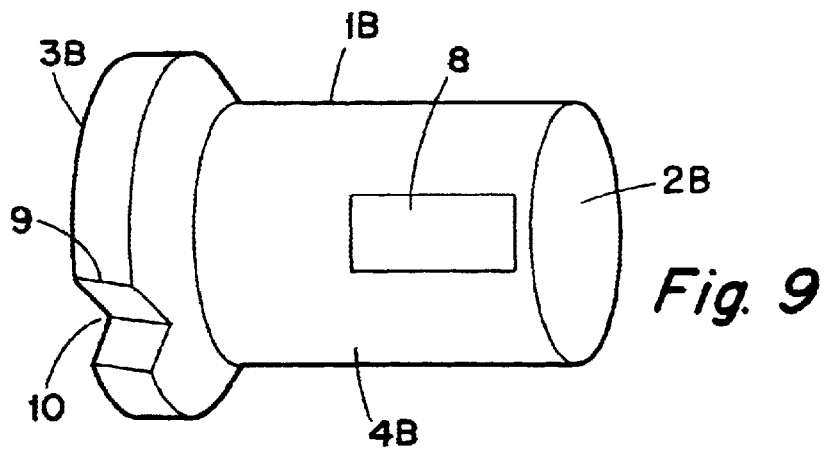
Figure 14:
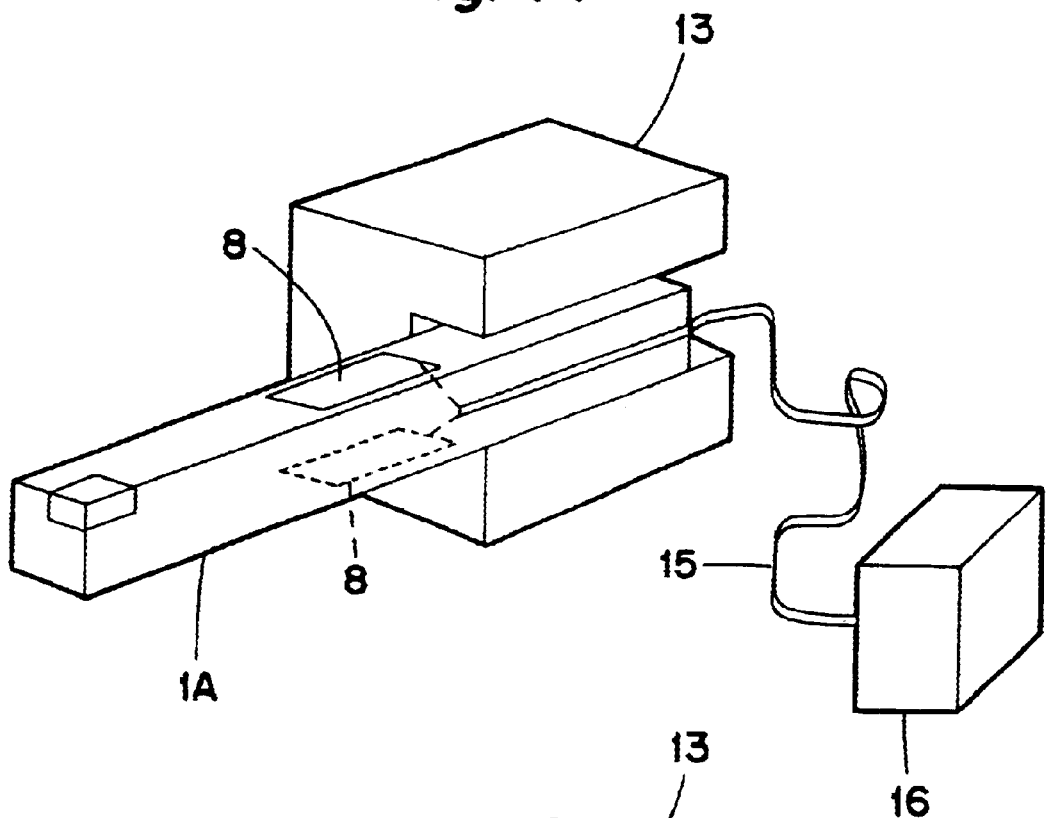
Figure 15:
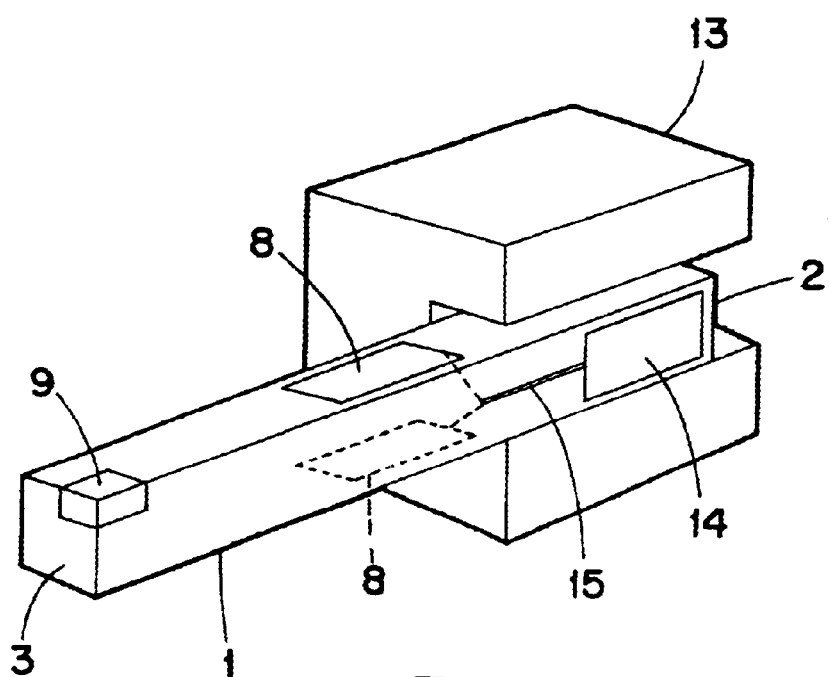

In the drawings:

FIG. 1 is a schematic side view of a long narrow body in the form of a tool shank during bending deformation during turning ($1^{st}$ resonance requency), FIG. 2 is a graph showing the bending moment in the body, FIG. 3 is a side view of a cross sectional end portion of the body adjacent to a clamping end so as to illustrate the tension proportional to strain in the body during bending deformation, FIG. 4 is a schematic side view of a long narrow body during torsional or shear strain, FIG. 5 is a graph showing the torsional moment during the last-mentioned deformation, FIG. 6 is a circular cross-section through the body according to FIG. 4 so as to illustrate the shear strain proportional to shear strains in the body, FIG. 7 is a view of a portion of a body showing deformation of a surface portion during torsional stress, FIG. 8 is a transparent perspective view of a tool shank according to the invention, FIG. 9 is a perspective view of a bar extender for milling tools formed with circular cross-section, FIG. 10 is a side view of a drilling tool according to the invention, FIGS. 11–13 are perspective views of tool shanks with quadratic cross-sections and in different alternative embodiments, FIG. 14 is a perspective view of a tool for active vibration dampening mounted in a carrier, and FIG. 15 is an analogous perspective view of an alternative embodiment for passive vibration dampening.

BRIEF DESCRIPTION OF GENERAL DEFORMATION CASES

In FIGS. 1–7, different deformation cases during which oscillations or vibrations may arise are shown schematically.

In FIG. 1, a long narrow body is illustrated which may consist of a tool or a shank of a tool. The body 1 has a clamping end 2 and a free, outer end 3. The body has an external surface 4, which may consist of an envelope surface if the body is cylindrical. It may also include a plurality of plane surfaces if the body has a polygonal, e.g. square cross-sectional shape. The body 1 may have an arbitrary cross-sectional shape, however, most are usually circular or square. In FIG. 1, numeral 5 designates a part in which the body 1 is clamped, the body extending console-like from the clamping part. In FIG. 1, the body 1 is shown in a state when it has been deformed in a first bending eigenmode. Furthermore, a graph is shown in FIG. 2, which illustrates how the bending moment $M_b$ in this case varies along the body. As is seen in the graph, a largest bending moment, and thus a largest strain, arises at or near the clamping end 2. The same is valid for all lower modes, which are normally dominating energy-wise during bending vibration of tools for chip removing machining. In FIG. 3, a portion of the body 1 deformed by deflection in FIG. 1 is shown in the area of the clamping end. In doing so, how the strain at bending deformation varies in the cross-direction of the body (the strain is highly exaggerated for illustrative reasons) is illustrated. As is seen in the figure, the largest strains are obtained at the envelope or outer surface 4 of the body.

In FIG. 4, a long narrow body 1 is shown which has been deformed in a first torsional eigenmode. Furthermore, in FIG. 5 a graph is shown which illustrates how the torsional moment $M_t$ in this case varies along the body. As is seen in the graph, the largest torsional moment, and thus the largest shear strain, is obtained closest the clamping part 5. The same is valid for all lower modes, which are normally dominating energy-wise during torsional vibration of tools for chip removing machining. In FIG. 6, a circular cross-section of the body 1 according to FIG. 4 is shown, illustrating how the shear strain at shear deformation varies along the diameter of the cross-section (the shear strain is highly exaggerated for illustrative reason). As is seen in the figure, the largest shear strain is obtained closest the envelope surface 4.

In FIG. 7, a portion of the body 1 is shown, illustrating deformation during torsional stress of two hypothetical, square surfaces 6, 7 applied on the envelope surface 4, which surfaces are oriented with the edges thereof along and perpendicularly, as well as in 45° degree's angle to the longitudinal extension of the body 1 (the deformation is highly exaggerated for illustrative reason). As is seen in the figure, the surface 6 will, at shear strain, be deformed to a rhombic shape, while the surface 7 is deformed to a rectangular shape. During bending deformation, essentially the opposite relationship will be obtained, in the case where the bending is carried out across the plane of the surfaces 6, 7, i.e. the surface 6 will be deformed to a rectangular shape, while the surface 7 is deformed to a rhombic shape.

Detailed Description of Preferred Embodiments of the Invention

In FIG. 8, a fundamental design of a long narrow tool or shank 1 is shown schematically in which two flat-shaped, rectangular piezo-elements 8 are fastened on opposite, longitudinal plane surfaces 4 of the shank formed with square cross-section. The piezo-elements 8 are placed in the area near the clamping end 2 of the shank. At the outer end 3 thereof, the shank has a machining element in the form of a cutting insert 9. Thus, the piezo-elements 8 are positioned in an area where the largest strain occurs at bending deformation as well as torsional deformation. Although this location is preferred, other locations are also feasible. Furthermore, the piezo-elements 8 are oriented with the major faces thereof essentially parallel to the plane surfaces 4 of the shank and with the major axes essentially parallel to the length extension of the shank 2, and the piezo-elements 8 during bending vibration will be deformed whilst retaining a rectangular shape, while the same at torsional vibration will be deformed to a rhombic shape (compare FIG. 7). The direction of polarization of the flat-shaped, rectangular piezo-elements is here, and in the following, assumed to be parallel to the major axes of the same, although another shape as well as another direction of polarization is feasible. Thereby, the piezo-elements act, at the orientation in question of the same, most efficiently for dampening of bending vibration, since the same in this case undergo a maximum average deformation along the direction of polarization.

The relationship between the size of the piezo-elements 8 and the size of the shank in FIG. 8 and the following figures should not be understood as limiting, but are only selected in order to make the exemplified location and orientation of the piezo-elements clear. The number of piezo-elements and their orientation shown in the figures should not be regarded as limiting but only as exemplifying. Neither need a plurality of piezo-elements formed on the shank have the similar location, size, shape or orientation. The number of piezo-elements may vary, but should, however, for reasons of balance, amount to at least two.

In FIG. 9, an embodiment is shown according to which the body 1 consists of a bar extension with a circular cross-section intended for milling tools. In this case, a cutting machining element 9 in the form of an edge formed adjacent to a chip pocket 10 at the free end 3 of the bar extension. A piezo-element 8 is attached to the envelope surface 4 of the bar extension in an area near the clamping end 2. The major axis of the piezo-element is parallel to the length extension of the bar extender. Consequently, with this orientation the piezo-element 9 acts most efficiently for dampening of bending vibration also here.

FIG. 10 shows another embodiment example where the body or the tool 1 consists of a drill with a shank having a circular cross-section and a so called adapter. A piezo-element 8 is attached on the tool with the major axis thereof at an approx. 45° angle to the length extension of the tool. Thereby, the piezo-element acts most efficiently for dampening of torsional vibrations (compare FIG. 7).

For a simultaneous dampening of bending and torsional vibrations, the shank of the tool is advantageously formed with a plurality of piezo-elements of which some are oriented with the long sides thereof essentially parallel to the length extension of the shank, while other are oriented at approx. 45° angle. Alternatively, one or more piezo-elements have other orientations between these orientations in order to individually achieve sensitivity for both bending and torsional vibrations.

Piezo-elements are usually fragile, especially those of a ceramic type. Therefore, in demanding environments they should have some form of protection to achieve an acceptable service life. In FIGS. 11–13, a tool shank with a quadratic cross-section is shown, the piezo-elements 8 being attached and protected in alternative ways. In all cases, the piezo-elements are placed in an area near the clamping part 5 (this one may consist of a conventional clamping in which the tool is detachably mounted). In FIG. 11, the piezo-element 8 is mounted in a recess 11 and advantageously covered by a protective coat, for instance of epoxy type. In FIG. 12, the piezo-element is assumed to be mounted in the countersink 11 and covered by a stiff lid 12. In FIG. 13, the piezo-element 8 is mounted, e.g. fixed by cement, on the outside of the shank. These alternatives should only be seen as examples of which the ones shown in FIGS. 11 and 12 are preferred. It will be appreciated that the same type of protection for the piezo-elements is independent of the cross-section shape of the tool shank.

According to the invention, the piezo-elements may co-operate with means for electric control or steering of the same. In FIGS. 14 and 15, examples are shown of how the tool 1 has been formed with such control means. In these cases, the tool is mounted in a carrier 13. In FIG. 15, a control means for passive dampening is shown in the form of a control module 14 formed near the clamping end 2 and an electric connection 15, via which two piezo-elements 8 are connected to the control module 14 for a separate or common control of the respective piezo-element. This module 14 comprises at least electric resistive components. Preferably the control module 14 also comprises one or more shunts, and selected frequencies may be dampened specially effectively.

FIG. 14 illustrates a control means for active dampening in the form of a detached logical control circuit 16, e.g. a programmable microprocessor, for separate or common control of (via the schematically shown electric connection 15) the voltage applied over the piezo-element 8. In practice, the connection 15 may in this case comprise collector shoes or the like. Even if the piezo-elements 8 in the embodiment exemplified in FIG. 14 for active dampening at the same time act as both operating devices and sensors, it is feasible to achieve these two functions by separate operating device and sensors, the sensors do not need to consist of piezo-elements. Although the exemplified location of the control module 14 and the logical control circuit 16, respectively, is preferred, also other locations are feasible. For instance, it is feasible to, like the logical control circuit 16, form the control module 14 detached from the tool. The advantage of placing the control module 14 near the clamping end is that the module is easy to connect to the piezo-elements, while the same at a separate placing becomes easier to protect against harmful mechanical actuation.

A robust tool for chip removing machining with the ability to not only passive but also active dampening of bending as well as torsional vibrations over a wide range of frequencies is provided by the invention. Furthermore, a tool is provided which, on the one hand, presents a longer service life for the tool itself as well as the cutting or machining elements thereof and, on the other hand, brings about an increased quality of the surface on the machined workpiece. In addition, an improved working environment is attained through the reduction of high frequency noise in comparison with previously known tools.

Feasible Modifications of the Invention

The invention is not solely restricted to the embodiments and applications described and shown in the drawings. Thus, it is feasible to, by active control of the piezo-elements, introduce or reinforce vibrations if these are desirable, e.g. during chip breaking. Relatively large amplitudes may be obtained for introduced or reinforced vibrations with frequencies near the eigenvalue frequencies of the tool.

What is claimed is:

1. A tool for chip removing machining comprising:
   a shank defining a longitudinal axis and including a clamping end adapted for clamping the shank in a machine, and free end disposed longitudinally opposite the clamping end;
   a cutting element disposed at the free end of the shank; and
   a pair of flat piezo-elements mounted on respective opposite regions of the shaft at a location adjacent to the clamping end, each piezo-element being shorter than the shank, wherein a direction of polarization of each piezo-element is substantially parallel to the longitudinal axis, and a logic circuit operably connected to the piezo-elements and connectible to an external voltage source for energizing the piezo-elements, wherein both piezo-elements function together to define an actuator for actively dampening bending vibrations of the shank.

2. The tool according to claim 1 wherein the piezo-elements are disposed on an external surface of the shank.

3. The tool according to claim 1 wherein each piezo-element is disposed in a recess formed in an external surface of the shank.

4. The tool according to claim 1 wherein a length of the shank is 3 to 15 times larger than a diameter of the shank.

5. The tool according to claim 4 wherein the length of the shank is about 4 to 6 times larger than the diameter.

6. A machining assembly comprising:

a clamp; and a tool mounted to the clamp, the tool comprising:

a shank defining a longitudinal axis and including an external surface defining a diameter, a longitudinal length of the shank being in the range of 3 to 15 times larger than a diameter of the shank, the shank including a clamping end mounted in the clamp, and a free end disposed longitudinally opposite the clamping end, a cutting element disposed at the free end of the shank, a pair of flat piezo-elements mounted on respective diametrically opposite regions of the shaft, the regions located adjacent to the clamping element, each piezo-element being shorter than the shank, wherein a direction of polarization of each piezo-element is substantially parallel to the longitudinal axis, and a logic circuit operably connected to a source of voltage and the piezo-elements for energizing the piezo-elements wherein the piezo-elements function together to define an actuator for actively dampening bending vibrations of the shank.

7. The machining assembly according to claim 6 wherein the piezo-elements are disposed on an external surface of the shank.

8. The machining assembly according to claim 7 wherein each piezo-element is disposed in a recess formed in an outer surface of the shank.

9. The machining assembly according to claim 6 wherein the shaft length is in the range of 4 to 6 times longer than the shank diameter.

* * * * *